United States Patent
Kaji et al.

(10) Patent No.: US 12,305,987 B2
(45) Date of Patent: May 20, 2025

(54) SENSOR

(71) Applicant: KABUSHIKI KAISHA TOSHIBA, Tokyo (JP)

(72) Inventors: Shiori Kaji, Kawasaki Kanagawa (JP); Ryunosuke Gando, Yokohama Kanagawa (JP); Yasushi Tomizawa, Fuchu Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 304 days.

(21) Appl. No.: 17/821,275

(22) Filed: Aug. 22, 2022

(65) Prior Publication Data
US 2023/0266123 A1    Aug. 24, 2023

(30) Foreign Application Priority Data
Feb. 24, 2022   (JP) .................................. 2022-026380

(51) Int. Cl.
*G01C 19/5733*    (2012.01)
(52) U.S. Cl.
CPC ................................ *G01C 19/5733* (2013.01)
(58) Field of Classification Search
CPC ................................................. G01C 19/5733
USPC ..................................................... 73/504.12
See application file for complete search history.

(56) References Cited

U.S. PATENT DOCUMENTS

| | | | |
|---|---|---|---|
| 6,349,597 B1* | 2/2002 | Folkmer | G01C 19/5712 73/504.12 |
| 2018/0274923 A1 | 9/2018 | Ikehashi | |
| 2020/0284582 A1 | 9/2020 | Kaji et al. | |
| 2024/0369361 A1* | 11/2024 | Parajuli | G01C 19/5684 |

FOREIGN PATENT DOCUMENTS

| | | |
|---|---|---|
| JP | 2018-163141 A | 10/2018 |
| JP | 2020-144065 A | 9/2020 |
| WO | WO 2007/058565 A1 | 5/2007 |

* cited by examiner

*Primary Examiner* — Walter L Lindsay, Jr.
*Assistant Examiner* — Philip T Fadul
(74) *Attorney, Agent, or Firm* — Finnegan, Henderson, Farabow, Garrett & Dunner, LLP

(57) ABSTRACT

According to one embodiment, a sensor includes a base body, a first fixed portion, a movable portion, a connecting portion, and a first fixed electrode. The first fixed portion is fixed to the base body. The movable portion is provided around the first fixed portion and includes first to third partial regions. The first partial region is annular. The second partial region is annular. The second partial region is provided between the first partial region and the first fixed portion. The third partial region is annular. The third partial region is provided between the first and second partial regions and centered on the first fixed portion. The third partial region includes a first movable portion electrode. The connecting portion is provided between the first fixed portion and the second partial region. The first fixed electrode is fixed to the based body and faces the first movable portion electrode.

19 Claims, 12 Drawing Sheets

SENSOR

CROSS-REFERENCE TO RELATED APPLICATIONS

This application is based upon and claims the benefit of priority from Japanese Patent Application No. 2022-026380, filed on Feb. 24, 2022; the entire contents of which are incorporated herein by reference.

FIELD

Embodiments of the invention generally relate to a sensor.

BACKGROUND

There are sensors such as gyro sensors. It is desired to improve the characteristics of the sensor.

DETAILED DESCRIPTION

Figure 1:
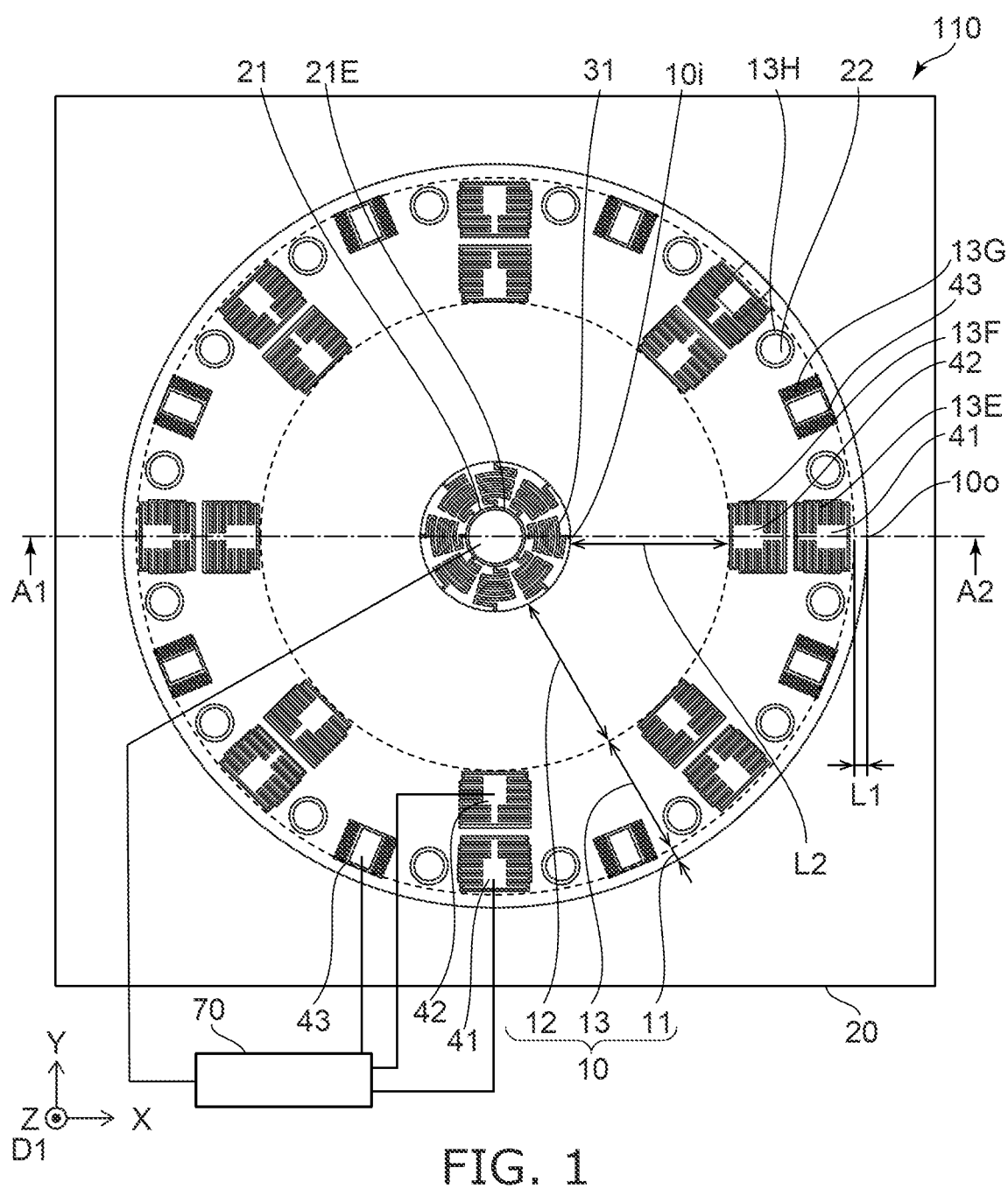
FIG. 1 is a schematic plan view illustrating a sensor according to a first embodiment.

According to one embodiment, a sensor includes a base body, a first fixed portion, a movable portion, a connecting portion, and a first fixed electrode. The first fixed portion is fixed to the base body. The movable portion is provided around the first fixed portion in a first plane crossing a first direction from the base body to the first fixed portion. The movable portion includes a first partial region, a second partial region, and a third partial region. The first partial region is annular. The first partial region is centered on the first fixed portion. The second partial region is annular. The second partial region is provided between the first partial region and the first fixed portion and centered on the first fixed portion. The third partial region is annular. The third partial region is provided between the first partial region and the second partial region and centered on the first fixed portion. The third partial region includes a first movable portion electrode. The connecting portion is provided between the first fixed portion and the second partial region. The connecting portion connects the second partial region to the first fixed portion. A first gap is provided between the base body and the movable portion, and between the base body and the connecting portion. The first fixed electrode is fixed to the based body. The first electrode faces the first movable portion electrode. A second area of the second partial region on the first plane is not less than a first area of the first partial region on the first plane.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously in an antecedent drawing are marked with like reference numerals, and a detailed description is omitted as appropriate.

First Embodiment

Figure 2:
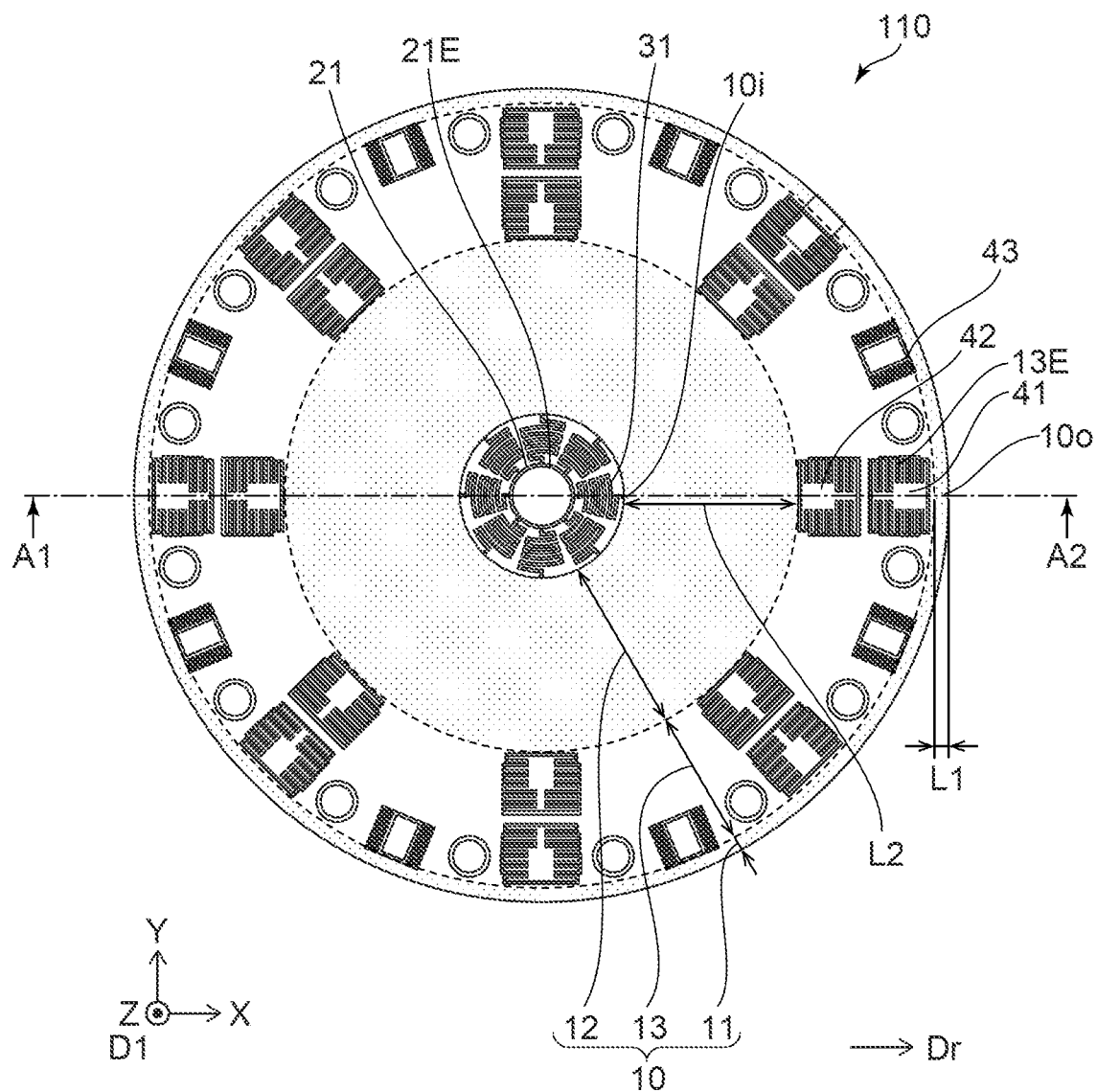
FIG. 2 is a schematic plan view illustrating the sensor according to the first embodiment.

FIGS. 1 and 2 are schematic plan views illustrating the sensor according to the first embodiment.

Figure 3:
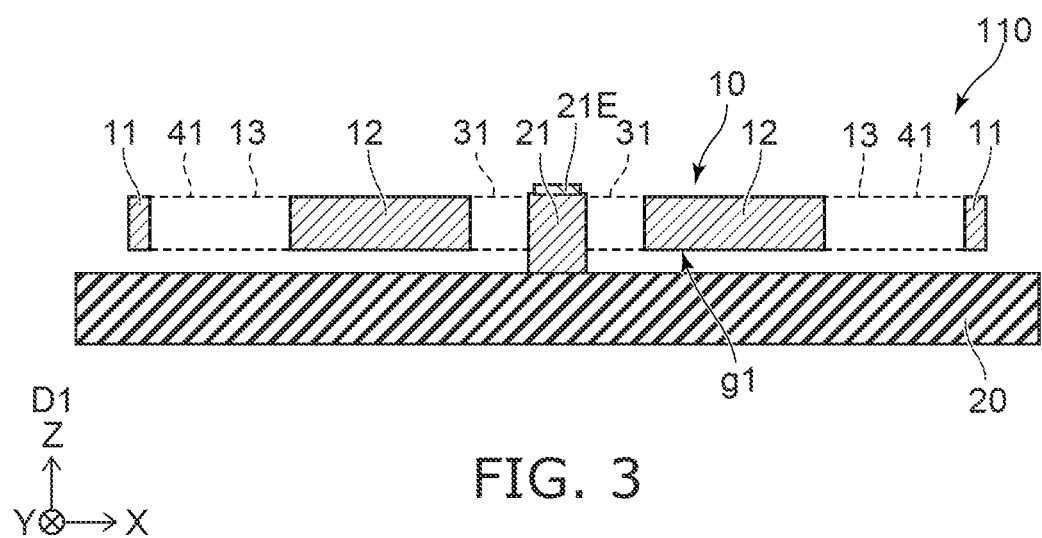
FIG. 3 is a schematic cross-sectional view illustrating the sensor according to the first embodiment.

FIG. 3 is the schematic cross-sectional view illustrating the sensor according to the first embodiment. FIG. 3 is a sectional view taken along line A1-A2 of FIG. 1. As shown in FIGS. 1 to 3, a sensor 110 according to the embodiment includes a base body 20, a first fixed portion 21, a movable portion 10, a connecting portion 31, and a first fixed electrode 41. In FIG. 3, the connecting portion 31 and the first fixed electrode 41 are illustrated in broken lines and their exact shapes are omitted.

The base body 20 may include, for example, a silicon substrate. The first fixed portion 21 is fixed to the base body 20. At least a part of the first fixed portion 21 is conductive.

A direction from the base body 20 to the first fixed portion 21 is defined as a first direction D1. The first direction D1 is a Z-axis direction. One direction perpendicular to the Z-axis direction is defined as an X-axis direction. The direction perpendicular to the Z-axis direction and the X-axis direction is defined as a Y-axis direction.

The movable portion 10 is provided around the first fixed portion 21 in a first plane crossing the first direction D1. The first plane is, for example, the X-Y plane. The movable portion 10 is an annular shape centered on the first fixed portion 21. The movable portion 10 includes an outer edge portion 10o and an inner edge portion 10i. The inner edge portion 10i is located between the first fixed portion 21 and the outer edge portion 10o. For example, the outer edge portion 10o has a circular shape centered on the first fixed portion 21. For example, the inner edge portion 10i has a circular shape centered on the first fixed portion 21. The movable portion 10 is conductive. At least one of the outer edge portion 10o and the inner edge portion 10i may be polygonal.

The movable portion 10 includes a first partial region 11, a second partial region 12, and a third partial region 13. FIG. 2 illustrates the first partial region 11, the second partial region 12, and the third partial region 13. The first partial region 11 is an annular shape centered on the first fixed portion 21. The first partial region 11 includes an outer edge portion 10o. The second partial region 12 is provided between the first partial region 11 and the first fixed portion 21. The second partial region 12 is an annular shape centered on the first fixed portion 21. The second partial region 12 includes the inner edge portion 10i.

The third partial region 13 is provided between the first partial region 11 and the second partial region 12. The third partial region 13 is an annular shape centered on the first fixed portion 21. The third partial region 13 includes a first movable portion electrode 13E. The third partial region 13 is a region where the electrodes are provided. The first partial region 11 is an outer region. The second partial region 12 is an inner region.

The connecting portion 31 is provided between the first fixed portion 21 and the second partial region 12. The connecting portion 31 connects the second partial region 12 to the first fixed portion 21. The connecting portion 31 is conductive.

As shown in FIG. 3, a first gap g1 is provided between the base body 20 and the movable portion 10 and between the base body 20 and the connecting portion 31. The connecting portion 31 is, for example, a spring portion. The connecting portion 31 may have a meander structure.

The first fixed electrode 41 is fixed to the base body 20. The first fixed electrode 41 faces the first movable portion electrode 13E. For example, the first fixed electrode 41 faces the first movable portion electrode 13E in the first plane (for example, in the X-Y plane).

For example, the first movable portion electrode 13E is in contact with the inner end of the first partial region 11. For example, the first movable portion electrode 13E is in contact with the outer end of the third partial region 13. As will be described later, a second fixed electrode 42 may be further provided. As shown in FIG. 1, the second fixed electrode 42 faces the second movable portion electrode 13F. For example, the second movable portion electrode 13F is in contact with the outer end of the second partial region 12. For example, the second movable portion electrode 13F is in contact with the inner end of the third partial region 13.

As will be described later, the third partial region 13 includes a first fixed electrode hole 13EH (see FIG. 8A). The first fixed electrode 41 passes through the first fixed electrode hole 13EH. For example, the first fixed electrode hole 13EH is in contact with the inner end of the first partial region 11. As will be described later, the third partial region 13 includes a second fixed electrode hole 13FH (see FIG. 9). The second fixed electrode 42 passes through the second fixed electrode hole 13FH. For example, the second fixed electrode hole 3FH is in contact with the outer end of the second partial region 12.

In the embodiment, a circle can be defined centering on the first fixed portion 21 and passing through the outer end of the first fixed electrode 41. For convenience, this circle may be considered to correspond to the inner edge of the first partial region 11. A circle can be defined centered on the first fixed portion 21 and passing through the inner end of the second fixed electrode 42. For convenience, this circle may be considered to correspond to the outer edge of the second partial region 12.

For example, the sensor 110 may include a controller 70. The controller 70 may be provided separately from the sensor 110. The controller 70 can apply a voltage between the movable portion 10 and the first fixed electrode 41. For example, the electrode 21E is provided on the first fixed portion 21. The controller 70 is electrically connected to the movable portion 10 via the electrode 21E, the first fixed portion 21, and the connecting portion 31. The controller 70 can vibrate the movable portion 10 by applying an AC voltage between the movable portion 10 and the first fixed electrode 41. As a result, the movable portion 10 can vibrate along the X-Y plane, for example. The vibration is, for example, an in-plane translational vibration. In one example, translational vibrations along the X-axis direction occur.

In the embodiment, for example, when a force (angular velocity) is applied to a movable portion that vibrates in the X-axis direction in the initial state, the vibration state of the movable portion 10 changes. For example, in the movable portion 10, vibration including a component in the Y-axis direction occurs. For example, the movable portion 10 vibrates in a direction different from the initial state according to the applied angular velocity. The change in vibration state is based on, for example, the Coriolis force. By detecting the change in the vibration state, the force (the angular velocity) can be detected.

The movable portion 10 has a resonance mode different from the in-plane translation. For example, an in-plane rotation resonance, an out-of-plane twist resonance, and an out-of-plane translational resonance exist in the movable portion 10. The resonance of in-plane rotation is, for example, a resonance of rotation in the X-Y plane centered on the first fixed portion 21. The resonance of the out-of-plane twist is, for example, a resonance including a component of rotation out of the X-Y plane about the X-axis direction or the like. The out-of-plane translational resonance is, for example, a resonance along the Z-axis direction. These resonances are lower order resonances than that in the in-plane translations.

The detection result detected by the sensor 110 is affected by these low-order resonances. For example, by keeping the target in-plane translational resonance frequency and restraining dropping of the low-order resonances, the influence of the low-order resonance can be suppressed. As a result, the target force (the acceleration) can be detected with high accuracy.

In the embodiment, for example, the area of the second partial region 12 being inner is not less than the area of the first partial region 11 being outer. For example, the volume of the second partial region 12 is not less than the volume of the first partial region 11. For example, the mass of the second partial region 12 is not less than the mass of the first partial region 11. As a result, the dropping of the low-order resonance frequency can be restrained. The influence of low-order resonance can be suppressed. According to the embodiment, it is possible to provide a sensor whose characteristics can be improved. An example of resonance characteristics will be described later.

As shown in FIG. 2, a direction passing through the first fixed portion 21 and along the first plane (the X-Y plane) is defined as a radial direction Dr. A length of the first partial region 11 along the radial direction Dr is defined as a first length L1. A length of the second partial region 12 along the radial direction Dr is defined as a second length L2. The second length L2 is not less than the first length L1. With such a configuration, the dropping of the frequency of low-order resonance can be restrained. The influence of low-order resonance can be suppressed.

In the embodiment, the mass of the movable portion 10 is concentrated on the inner portion of the movable portion 10. As a result, the dropping of the low-order resonance frequency can be restrained. The influence of low-order resonance can be suppressed.

Hereinafter, an example of the simulation result regarding a change in the resonance frequency when the masses of the first partial region 11 and the second partial region 12 are changed will be described.

FIGS. 4A to 4D are graphs illustrating the characteristics of the sensor.

Figure 4A:
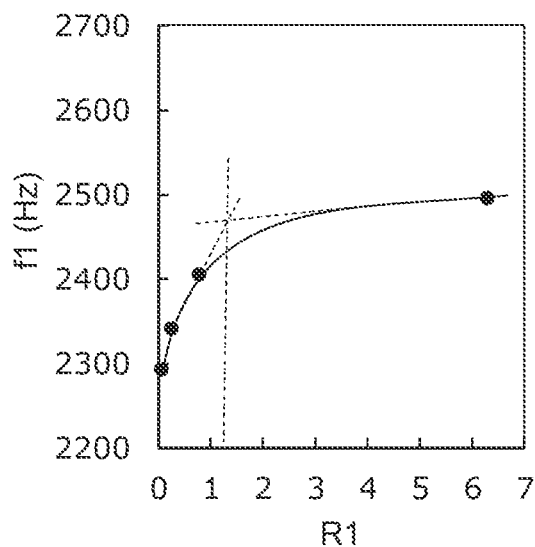
FIGS. 4A to 4D are graphs illustrating the characteristics of the sensor.
Figure 4B:
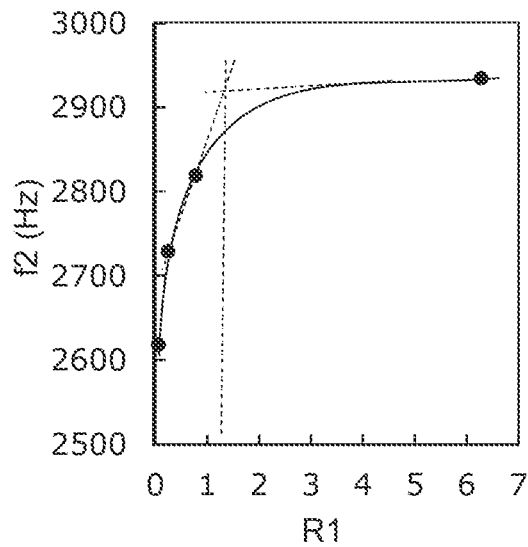
Figure 4C:
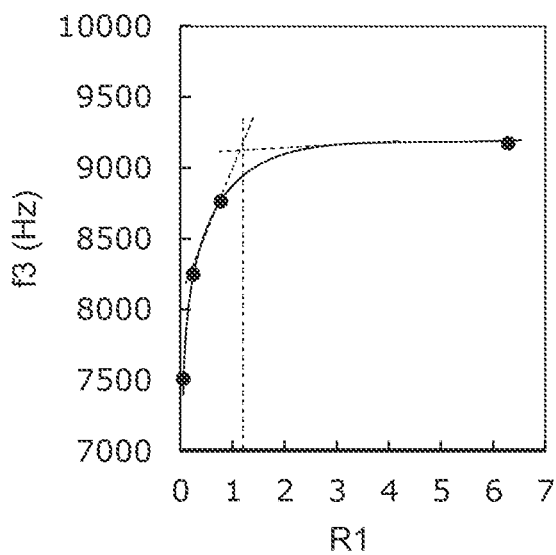
Figure 4D:
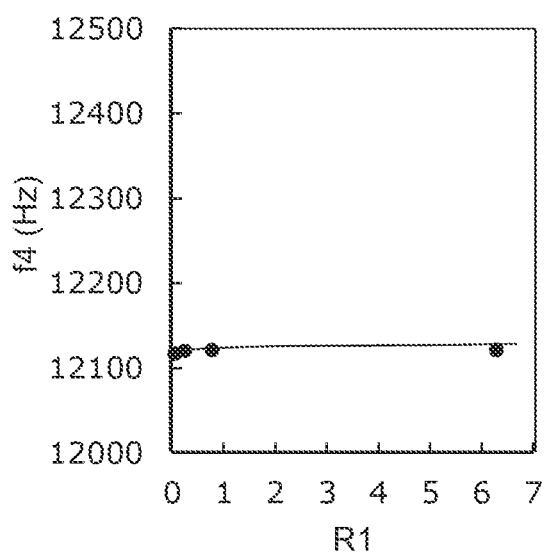

The horizontal axis of these figures is a mass ratio R1. A mass of the first partial region 11 is defined as a first mass M1. A mass of the second partial region 12 is defined as a second mass M2. The mass ratio R1 is a ratio (M2/M1) of the second mass M2 to the first mass M1. The vertical axis of FIG. 4A is a resonance frequency f1 of the in-plane rotation. The vertical axis of FIG. 4B is a resonance frequency f2 of the out-of-plane twist. There are two different types of resonance in the out-of-plane twist resonance. The resonance frequencies of these two types of resonance are close to each other. The resonance frequency f2 is a resonance frequency relating to one of these two types of resonance (relatively low frequency resonance). The characteristics of the resonance frequency for another one of the two types of resonance related to the out-of-plane twist (relatively high frequency resonance) are substantially the same as the characteristics of the resonance frequency f2, and thus the illustration is omitted. The vertical axis of FIG. 4C is a resonance frequency f3 of the out-of-plane translation. The vertical axis of FIG. 4D is a resonance frequency f4 of the in-plane translation. In the in-plane translational resonance, there are two different types of resonance. The frequencies of these two types of resonance are close to each other. The resonance frequency f4 is a resonance frequency relating to one of these two types of resonance (relatively low frequency resonance). The characteristics of the resonance frequency for another one of the two types of resonance related to in-plane translation (relatively high frequency resonance) are substantially the same as the characteristics of the resonance frequency f4, and thus the illustration is omitted. In this simulation, the mass ratio R1 is changed while keeping the in-plane translation frequency f4 constant. In FIGS. 4A to 4D, the mass of the movable portion 10 is about 2 mg. In this example, the width (for example, the diameter) of the movable portion 10 along the X-axis direction is 2500 μm.

As shown in FIGS. 4A to 4C, when the mass ratio R1 becomes low, the resonance frequency f1 of the in-plane rotation, the resonance frequency f2 of the out-of-plane twist, and the resonance frequency f3 of the out-of-plane translation decrease. When the mass ratio R1 is 1 or more, these resonance frequencies are maintained. The mass ratio R1 may be 1.2 or more. The resonance frequency is kept more stably.

FIGS. 5A to 5D are graphs illustrating the characteristics of the sensor.

Figure 5A:
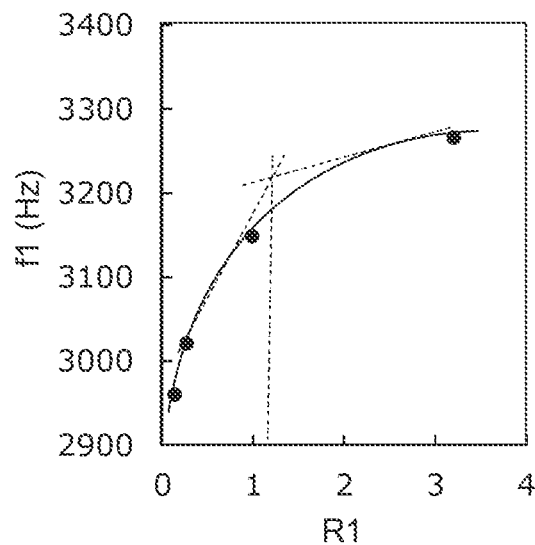
FIGS. 5A to 5D are graphs illustrating the characteristics of the senso.
Figure 5B:
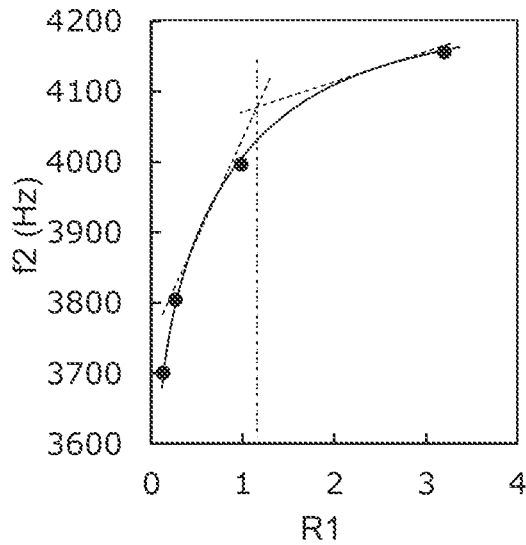
Figure 5C:
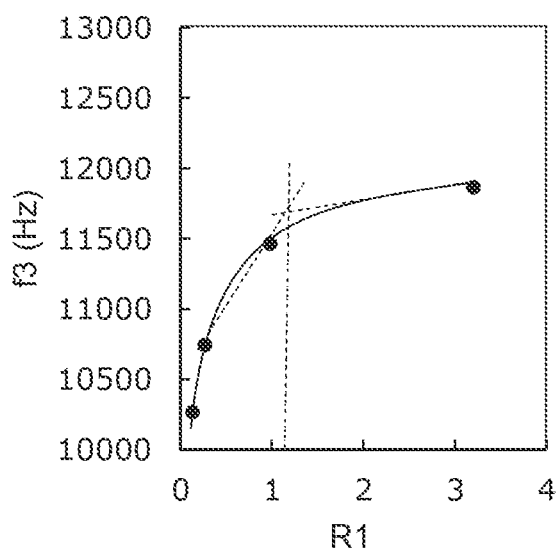
Figure 5D:
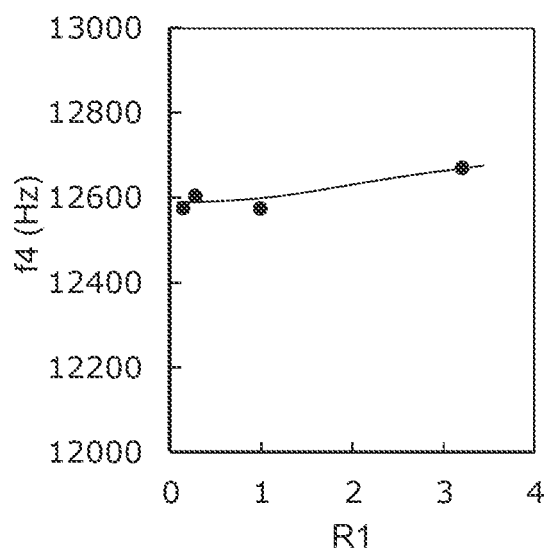

The horizontal axis of these figures is the mass ratio R1. The vertical axis of FIG. 5A is the resonance frequency f1 of the in-plane rotation. The vertical axis of FIG. 5B is the resonance frequency f2 of the out-of-plane twist. The vertical axis of FIG. 5C is the resonance frequency f3 of the out-of-plane translation. The vertical axis of FIG. 5D is the resonance frequency f4 of the in-plane translation. In this simulation, the mass ratio R1 is changed while keeping the frequency of the in-plane translation constant. In the example of FIGS. 5A to 5D, the mass of the movable portion 10 is about 1 mg. In this example, the width (for example, the diameter) of the movable portion 10 along the X-axis direction is 2000 μm. Also in FIG. 5B, the characteristic of the resonance frequency with respect to another one of the types of resonances relating to the out-of-plane twist is omitted. Also in FIG. 5D, the characteristic of the resonance frequency relating to another of the two types relating to the in-plane translation is omitted.

As shown in FIGS. 5A to 5C, when the mass ratio R1 becomes low, the resonance frequency f1 of the in-plane rotation, the resonance frequency f2 of the out-of-plane twist, and the resonance frequency f3 of the out-of-plane translation decrease. When the mass ratio R1 is 1 or more, these resonance frequencies are maintained. When the mass ratio R1 is 1.2 or more, these resonance frequencies are kept more stably.

In the embodiment, the mass ratio R1 is 1 or more. As a result, the resonance frequency f1 of the in-plane rotation, the resonance frequency f2 of the out-of-plane twist, and the resonance frequency f3 of the out-of-plane translation are maintained. The mass ratio R1 may be, for example, 1.2 or more. The mass ratio R1 may be, for example, 2 or more. The mass ratio R1 may be, for example, 3 or more.

For example, the specific density of the first partial region 11 may be substantially the same as the specific gravity of the second partial region 12. In this case, the mass ratio R1 corresponds to a volume ratio. The volume ratio is a ratio of the volume of the second partial region 12 to the volume of the first partial region 11. In the embodiment, the volume ratio is 1 or more. The volume ratio may be, for example, 1.2 or more. The volume ratio may be, for example, 2 or more. The volume ratio may be, for example, 3 or more.

For example, the thickness of the first partial region 11 may be substantially the same as the thickness of the second partial region 12. The thickness is a length along the Z-axis direction. In this case, the mass ratio R1 corresponds to an area ratio. The area ratio is a ratio of the area of the second partial region 12 to the area of the first partial region 11. In the embodiment, the area ratio is 1 or more. The area ratio may be, for example, 1.2 or more. The area ratio may be, for example, 2 or more. The area ratio may be, for example, 3 or more.

FIGS. 6A to 6D are graphs illustrating the characteristics of the sensor.

Figure 6A:
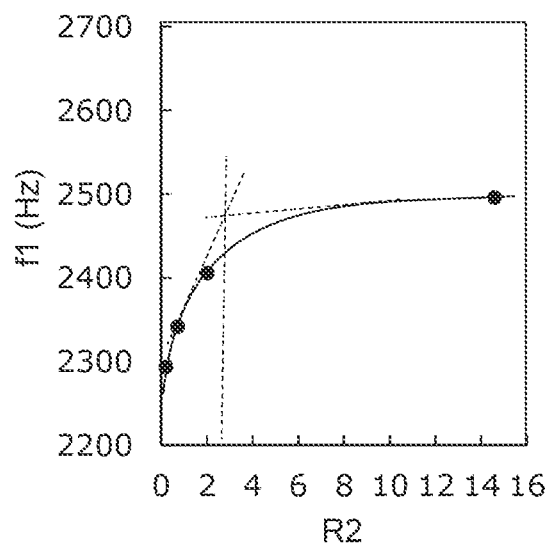
FIGS. 6A to 6D are graphs illustrating the characteristics of the sensor.
Figure 6B:
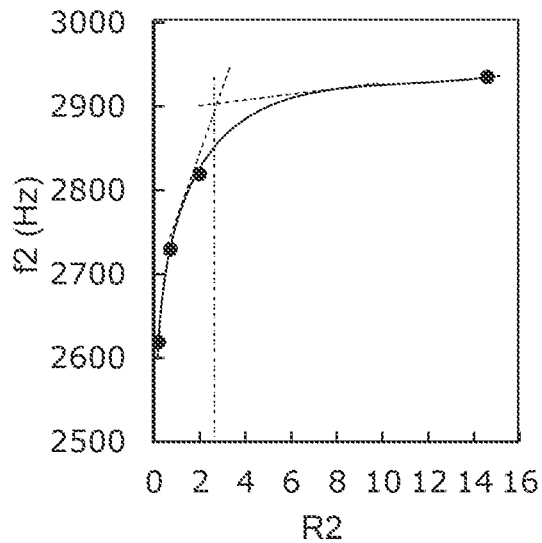
Figure 6C:
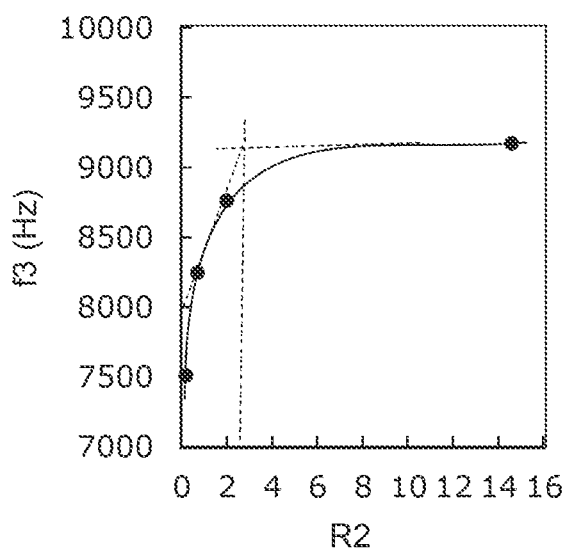
Figure 6D:
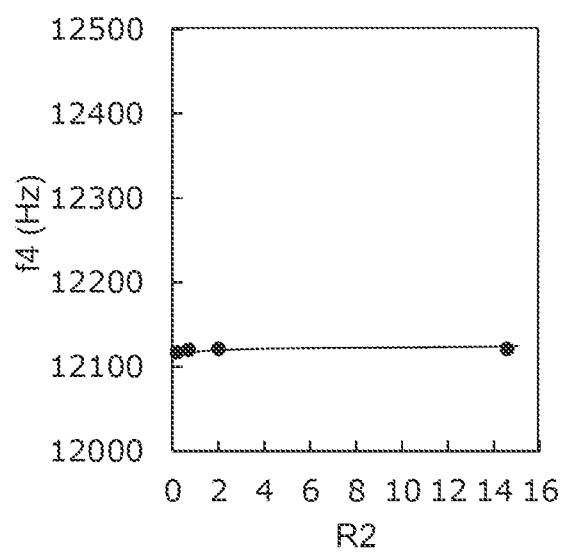

The horizontal axis of these figures is a length ratio R2. The length ratio R2 is a ratio (L2/L1) of the second length L2 to the first length L1. The vertical axis of FIG. 6A is the resonance frequency f1 of the in-plane rotation. The vertical axis of FIG. 6B is the resonance frequency f2 of the out-of-plane twist. The vertical axis of FIG. 6C is the resonance frequency f3 of the out-of-plane translation. The vertical axis of FIG. 4D is the resonance frequency f4 of the in-plane translation. Also in FIG. 6B, the characteristic of the resonance frequency with respect to another one of the types of resonances relating to the out-of-plane twist is omitted. Also in FIG. 6D, the characteristic of the resonance frequency relating to another of the two types relating to the in-plane translation is omitted. In the example of FIGS. 6A to 6D, the mass of the movable portion 10 is about 2 mg. In this example, the width (for example, the diameter) of the movable portion 10 along the X-axis direction is 2500 μm.

As shown in FIGS. 6A to 6C, when the length ratio R2 becomes low, the resonance frequency f1 of the in-plane rotation, the resonance frequency f2 of the out-of-plane twist, and the resonance frequency f3 of the out-of-plane translation decrease. When the length ratio R2 is 2 or more, these resonance frequencies are maintained. When the length ratio R2 is 2.5 or more, these resonance frequencies are maintained more stably.

FIGS. 7A to 7D are graphs illustrating the characteristics of the sensor.

Figure 7A:
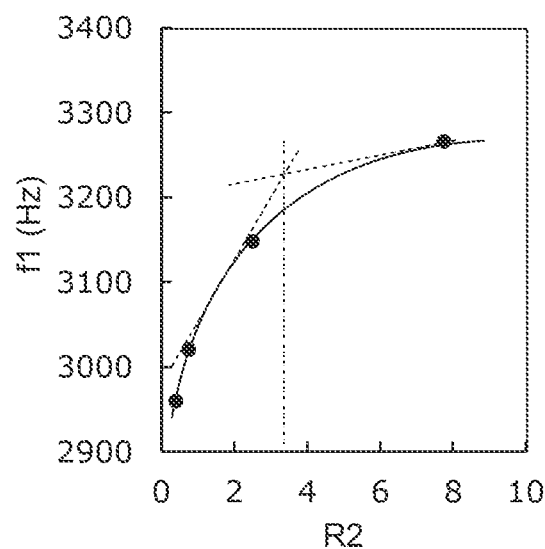
FIGS. 7A to 7D are graphs illustrating the characteristics of the sensor.
Figure 7B:
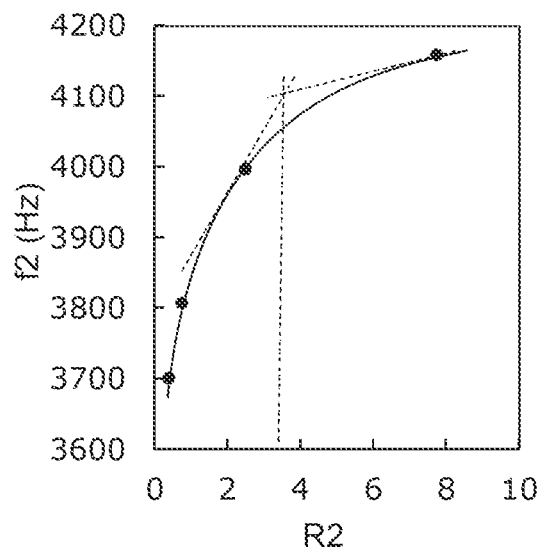
Figure 7C:
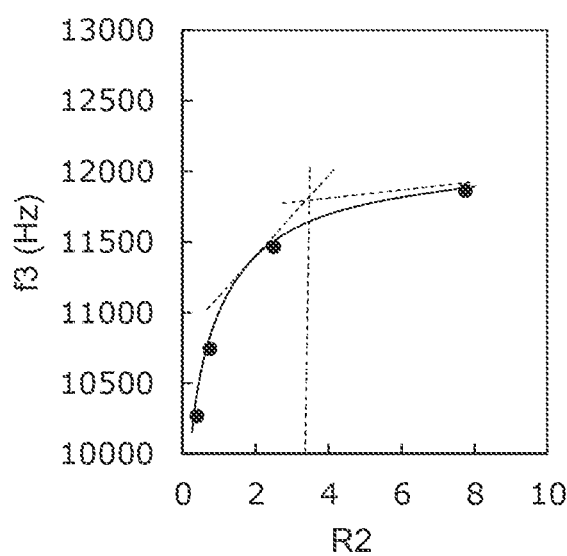
Figure 7D:
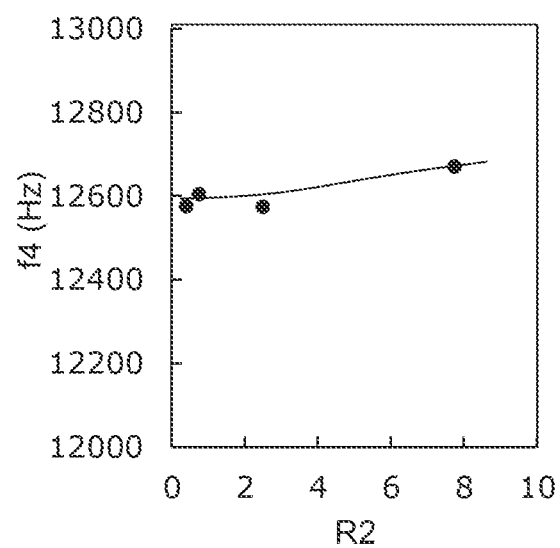

The horizontal axis of these figures is the length ratio R2. The vertical axis of FIG. 7A is the resonance frequency f1 of the in-plane rotation. The vertical axis of FIG. 7B is the resonance frequency f2 of the out-of-plane twist. The vertical axis of FIG. 7C is the resonance frequency f3 of the out-of-plane translation. The vertical axis of FIG. 7D is the resonance frequency f4 of the in-plane translation. In this simulation, the length ratio R2 is changed while keeping the frequency of the in-plane translation constant. In the example of FIGS. 7A to 7D, the mass of the movable portion 10 is about 1 mg. In this example, the width (for example, the diameter) of the movable portion 10 along the X-axis direction is 2000 µm. Also in FIG. 7B, the characteristic of the resonance frequency with respect to another one of the types of resonances relating to the out-of-plane twist is omitted. Also in FIG. 7D, the characteristic of the resonance frequency relating to another of the two types relating to the in-plane translation is omitted.

As shown in FIGS. 7A to 7C, when the length ratio R2 becomes low, the resonance frequency f1 of the in-plane rotation, the resonance frequency f2 of the out-of-plane twist, and the resonance frequency f3 of the out-of-plane translation decrease. When the length ratio R2 is 2.5 or more, these resonance frequencies are maintained. When the length ratio R2 is 3.5 or more, these resonance frequencies are maintained more stably.

In the embodiment, the length ratio R2 is 2 or more. The length ratio R2 may be 2.5 or more. The length ratio R2 may be 3.5 or more. As a result, the resonance frequency f1 of the in-plane rotation, the resonance frequency f2 of the out-of-plane twist, and the resonance frequency f3 of the out-of-plane translation are maintained.

In the embodiment, the second length L2 is not less than the first length L1. In the embodiment, the second length L2 is preferably twice or more the first length L1. The second length L2 may be 2.5 times or more the first length L1. The frequency of the low-order resonance can be effectively maintained. The influence of low-order resonance can be effectively suppressed.

Figure 8A:
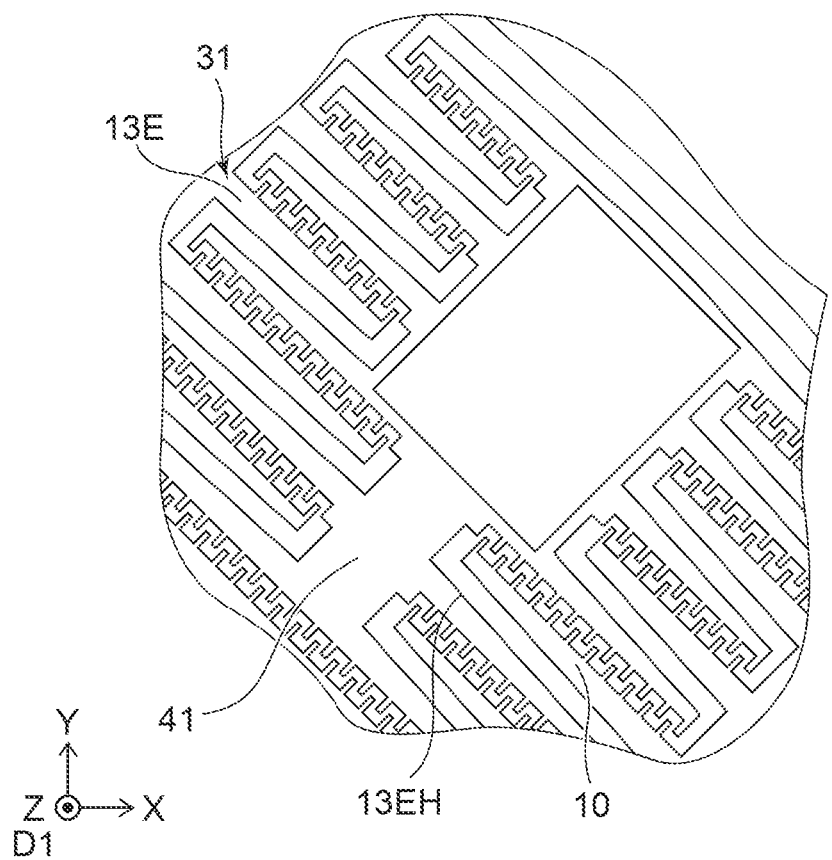
FIGS. 8A and 8B are schematic plan views illustrating a part of the sensor according to the first embodiment.
Figure 8B:
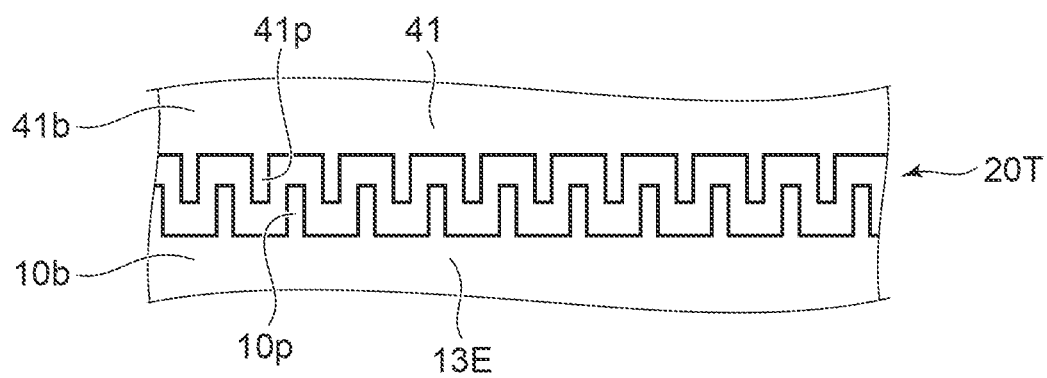

FIGS. 8A and 8B are schematic plan views illustrating a part of the sensor according to the first embodiment.

These figures exemplify the first fixed electrode 41 and the first movable portion electrode 13E in an enlarged manner. As shown in FIG. 8A, the third partial region 13 includes the first fixed electrode hole 13EH. The first fixed electrode hole 13EH extends along the first direction D1. The first movable portion electrode 13E is provided in the first fixed electrode hole 13EH. The first fixed electrode 41 passes through the first fixed electrode hole 13EH.

In this example, the first movable portion electrode 13E and the first fixed electrode 41 are comb-shaped. As shown in FIG. 8B, the first movable portion electrode 13E is one of the first comb tooth electrode pair 20T. The first fixed electrode 41 is the other side of the first comb tooth electrode pair 20T. The first movable portion electrode 13E includes a base portion 10b and a plurality of protruding portions 10p. The plurality of protruding portions 10p are connected to the base portion h10b. The first fixed electrode 41 includes a base portion 41b and a plurality of protruding portions 41p. The plurality of protruding portions 41p are connected to the base portion 41b. At least a part of one of the plurality of protruding portions 41p is provided between one of the plurality of protruding portions 10p and another one of the plurality of protruding portions 10p. At least a part of one the plurality of protruding portions 10p is provided between one of the plurality of protruding portions 41p and another one of the plurality of protruding portions 41p.

As shown in FIG. 1, in this example, the sensor 110 further includes a second fixed electrode 42. The second fixed electrode 42 is fixed to the base body 20. The third partial region 13 includes a second movable portion electrode 13F. In this example, the second fixed electrode 42 is provided between the second partial region 12 and the first fixed electrode 41.

Figure 9:
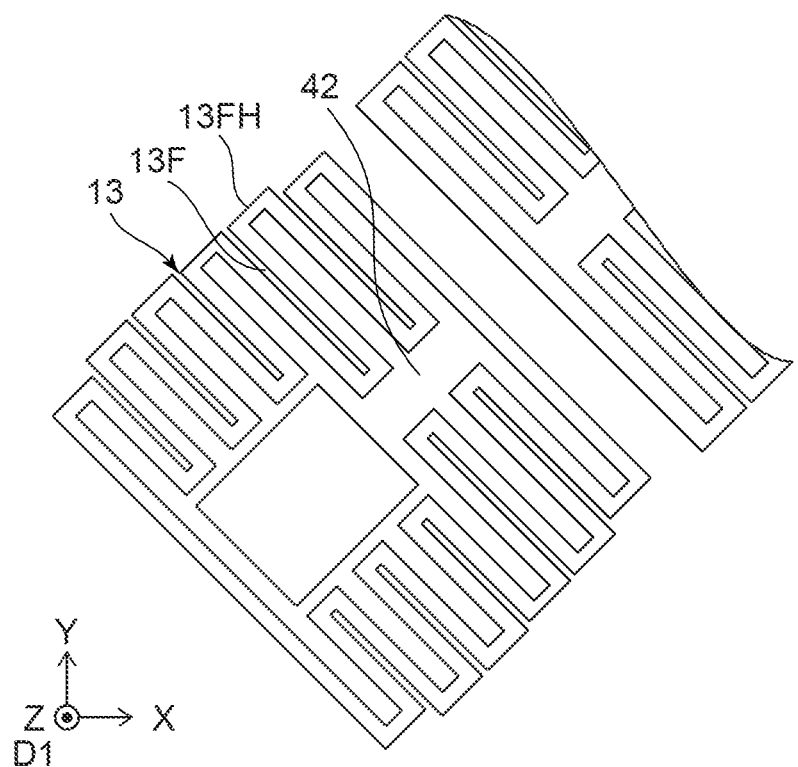
FIG. 9 is a schematic plan view illustrating a part of the sensor according to the first embodiment.

FIG. 9 is a schematic plan view illustrating a part of the sensor according to the first embodiment.

FIG. 9 illustrates the second fixed electrode 42 and the second movable portion electrode 13F. The second fixed electrode 42 faces the second movable portion electrode 13F. The third partial region 13 includes a second fixed electrode hole 13FH. The second movable portion electrode 13F is provided in the second fixed electrode hole 13FH. The second fixed electrode hole 13FH extends in the first direction D1. The second fixed electrode 42 passes through the second fixed electrode hole 13FH. The second fixed electrode 42 faces the second movable portion electrode 13F in the first plane (in the X-Y plane). A voltage may be applied between the second fixed electrode 42 and the second movable portion electrode 13F. As will be described later, the second fixed electrode 42 and the second movable portion electrode 13F may be a pair of comb tooth electrodes.

As shown in FIG. 1, a plurality of first movable portion electrodes 13E and a plurality of first fixed electrodes 41 may be provided. The plurality of first movable portion electrodes 13E are arranged in a circle centered on the first fixed portion 21. The plurality of first fixed electrodes 41 are arranged in a circle centered on the first fixed portion 21.

As shown in FIG. 1, the sensor 110 may further include a third fixed electrode 43. In this example, a plurality of third fixed electrodes 43 are provided. The plurality of third fixed electrodes 43 are fixed to the base body 20. The third partial region 13 includes a plurality of third movable portion electrodes 13G. For example, the plurality of third fixed electrodes 43 and the plurality of first fixed electrodes 41 are alternately arranged along a circle centered on the first fixed portion 21.

Figure 10:
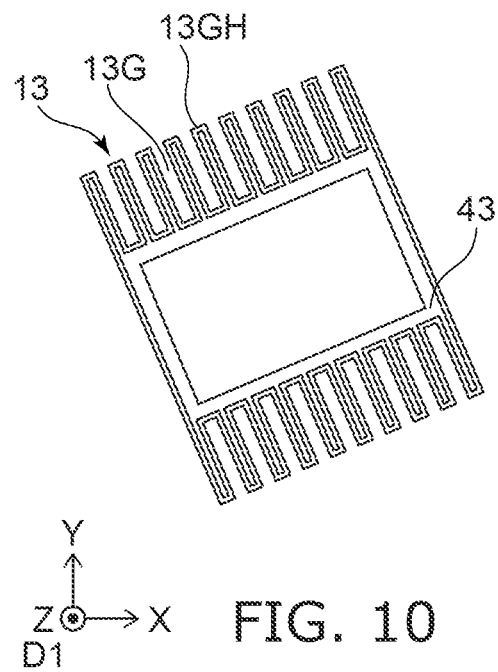
FIG. 10 is a schematic plan view illustrating a part of the sensor according to the first embodiment.

FIG. 10 is a schematic plan view illustrating a part of the sensor according to the first embodiment.

FIG. 10 illustrates one of a plurality of third fixed electrodes 43 and one of a plurality of third movable portion electrodes 13G. One of the plurality of third fixed electrodes 43 faces one of the plurality of third movable portion electrodes 13G. The third partial region 13 includes the third fixed electrode hole 13GH. The third movable portion electrode 13G is provided in the third fixed electrode hole 13GH. The third fixed electrode hole 13GH extends in the first direction D1. The third fixed electrode 43 passes through the third fixed electrode hole 13GH. The third fixed electrode 43 faces the third movable portion electrode 13G in the first plane (in the X-Y plane). A voltage may be applied between the third fixed electrode 43 and the third movable portion electrode 13G.

As shown in FIG. 1, the sensor 110 may further include a second fixed portion 22. The second fixed portion 22 is fixed to the base body 20.

Figure 11:
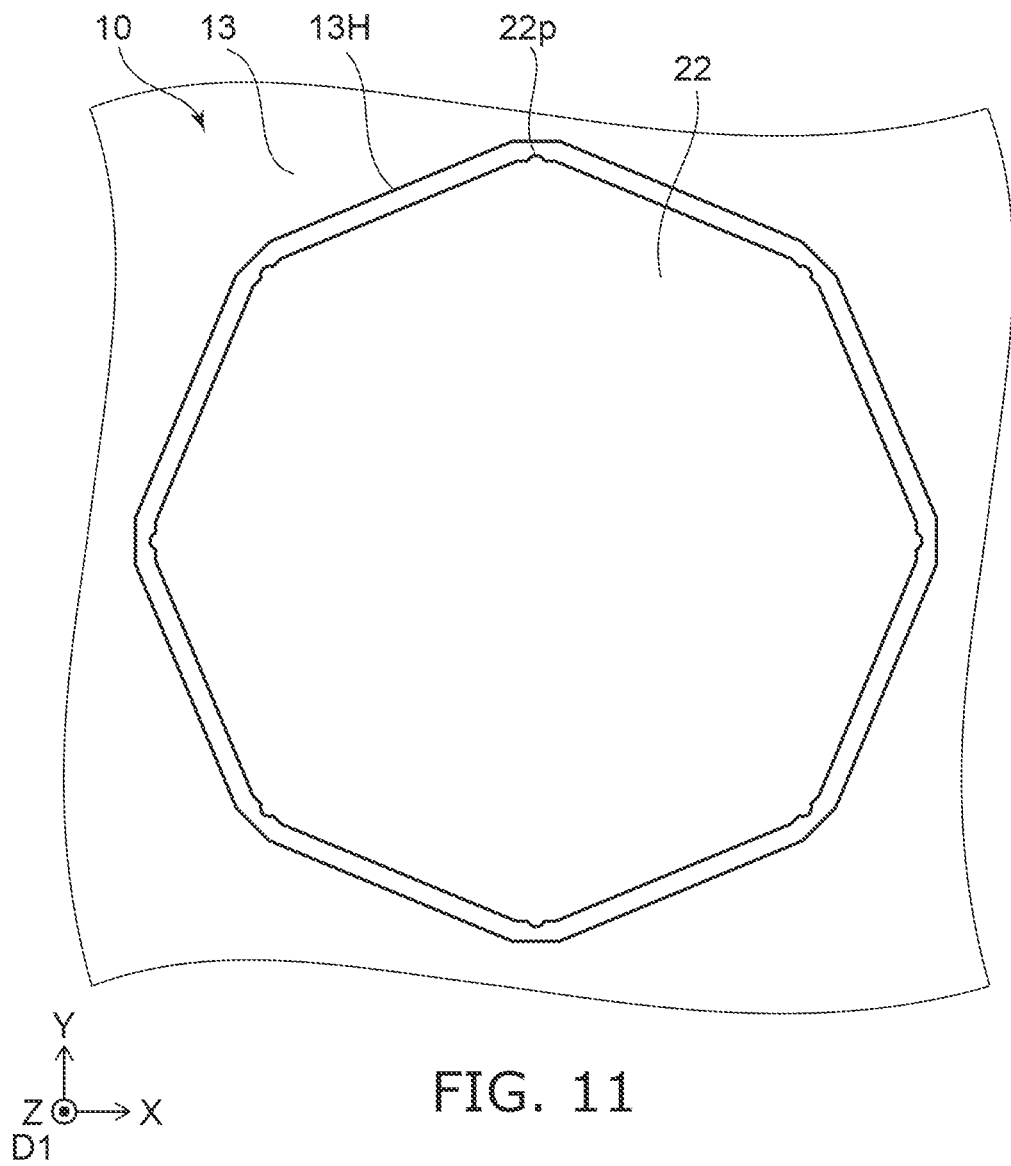
FIG. 11 is a schematic plan view illustrating a part of the sensor according to the first embodiment.

FIG. 11 is a schematic plan view illustrating a part of the sensor according to the first embodiment.

FIG. 11 illustrates the second fixed portion 22. The third partial region 13 includes the second fixed portion hole 13H. The second fixed portion 22 passes through the second fixed portion hole 13H. The second fixed portion 22 functions as, for example, a stopper.

In this example, the second fixed portion 22 includes a protruding portion 22p. By providing the protruding portion 22p, the area where the second fixed portion 22 comes into contact with the movable portion 10 becomes smaller when the movable portion 10 is largely displaced. Damage to the movable portion 10 is suppressed. Such a protruding portion may be provided on the movable portion 10.

Second Embodiment

Figure 12:
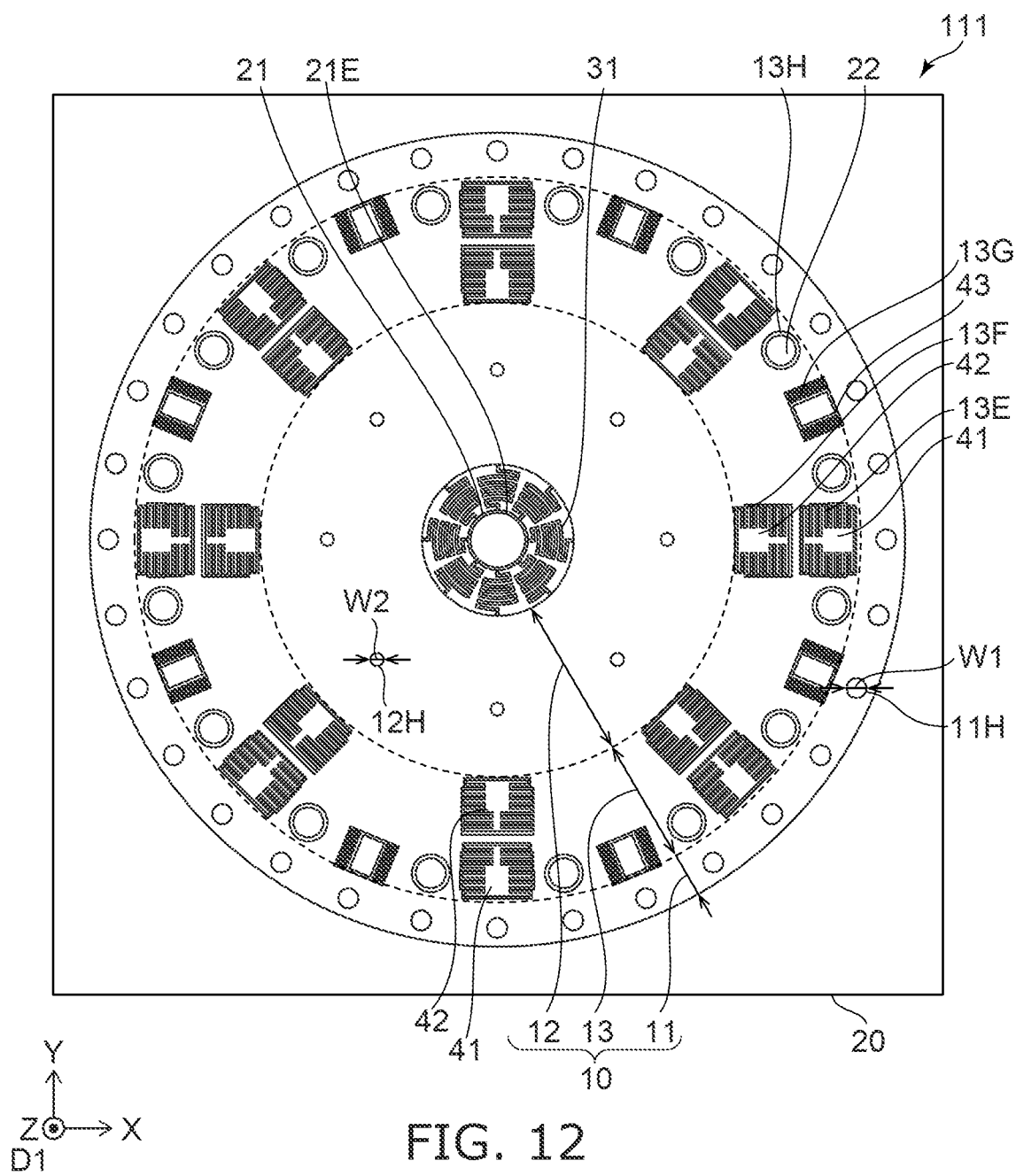
FIG. 12 is a schematic plan view illustrating the sensor according to the second embodiment.

FIG. 12 is a schematic plan view illustrating the sensor according to the second embodiment.

As shown in FIG. 12, in a sensor 111 according to the embodiment, the movable portion 10 includes a plurality of holes. Except for this, the configuration of the sensor 111 may be the same as that of the sensor 110. That is, the sensor 111 also includes the base body 20, the first fixed portion 21, the movable portion 10, the connecting portion 31, and the first fixed electrode 41. The movable portion 10 includes the first partial region 11, the second partial region 12, and the third partial region 13.

The first partial region 11 includes a plurality of first holes 11H. The plurality of first holes 11H have a first width W1 and a first density. The first width W1 is a length of one of the plurality of first holes 11H along the first radial direction. The first radial direction passes through the first fixed portion 21 and is along the first plane (the X-Y plane). For example, the first radial direction may be the X-axis direction. The first density is a density in the first plane (the X-Y plane) of the plurality of first holes 11H.

The second partial region 12 includes a plurality of second holes 12H. The plurality of second holes 12H have at least one of a second width W2 smaller than the first width W1 and a second density lower than the first density. The second width W2 is a length of one of the plurality of second holes 12H along a second radial direction. The second radial direction passes through the first fixed portion 21 and is along the first plane (the X-Y plane). For example, the second radial direction may be the X-axis direction. The second density is a density in the first plane (the X-Y plane) of the plurality of second holes 12H.

By providing such a plurality of first holes 11H, the mass of the first partial region 11 tends to be smaller than the mass of the second partial region 12. The frequency of the low-order resonance can be effectively maintained. The influence of the low-order resonance can be effectively suppressed.

For example, when forming the movable portion 10 and the connecting portion 31, the etchant passes through the plurality of first holes 11H and the plurality of second holes 12H. As a result, the first gap g1 (see FIG. 3) can be formed.

The plurality of first holes 11H and the plurality of second holes 12H may be provided in the movable portion 10 of the sensor 110. When these holes are provided in the movable portion 10 of the sensor 110, the widths or densities of these holes may be the same.

Figure 13:
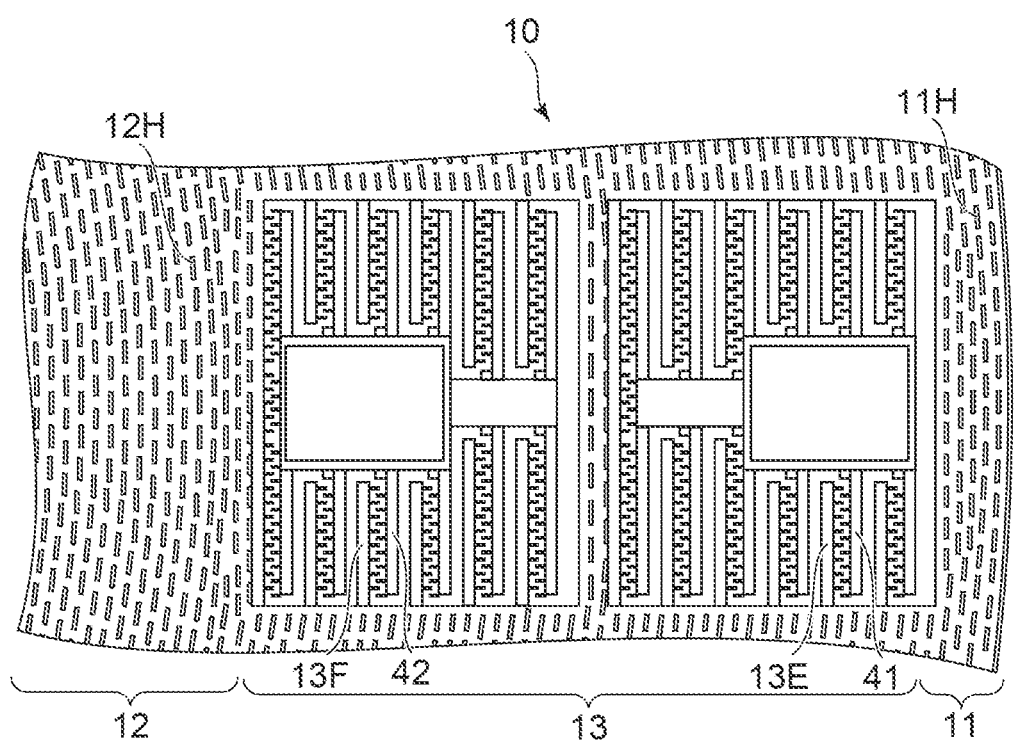
FIG. 13 is a schematic plan view illustrating a part of the sensor according to the second embodiment.

FIG. 13 is a schematic plan view illustrating a part of the sensor according to the embodiment.

FIG. 13 is an enlarged example of the movable portion 10. As shown in FIG. 13, the plurality of first holes 11H may be arcuate. For example, the plurality of first holes 11H have an arc shape centered on the first fixed portion 21. The plurality of second holes 12H may be arcuate. For example, the plurality of second holes 12H have an arc shape centered on the first fixed portion 21.

The plurality of holes may be provided in the third partial region 13. In the example shown in FIG. 13, the second fixed electrode 42 and the second movable portion electrode 13F are a pair of comb tooth electrodes.

In the embodiment, another fixed electrode may be provided around the movable portion 10 in the X-Y plane. Another fixed electrode faces the movable portion 10 (e.g., the first partial region 11). Another fixed electrode and the first partial region 11 are a pair of parallel plate electrodes. A plurality of different fixed electrodes may be arranged around the movable portion 10 along the circumferential direction.

The embodiments may include the following configurations (for example, technical proposals).

(Configuration 1)

A sensor, comprising:
  a base body;
  a first fixed portion fixed to the base body;
  a movable portion provided around the first fixed portion in a first plane crossing a first direction from the base body to the first fixed portion, the movable portion including:
    a first partial region being annular, the first partial region being centered on the first fixed portion,
    a second partial region being annular, the second partial region being provided between the first partial region and the first fixed portion and centered on the first fixed portion, and
    a third partial region being annular, the third partial region being provided between the first partial region and the second partial region and centered on the first fixed portion, the third partial region including a first movable portion electrode;
  a connecting portion provided between the first fixed portion and the second partial region, the connecting portion connecting the second partial region to the first fixed portion, a first gap being provided between the base body and the movable portion, and between the base body and the connecting portion; and
  a first fixed electrode fixed to the based body, the first electrode facing the first movable portion electrode,
  a second area of the second partial region on the first plane being not less than a first area of the first partial region on the first plane.

(Configuration 2)

The sensor according to Configuration 1, wherein the second area is 1.2 times or more the first area.

(Configuration 3)

A sensor, comprising:
  a base body;
  a first fixed portion fixed to the base body;
  a movable portion provided around the first fixed portion in a first plane crossing a first direction from the base body to the first fixed portion, the movable portion including:
    a first partial region being annular, the first partial region being centered on the first fixed portion,
    a second partial region being annular, the second partial region being provided between the first partial region and the first fixed portion and centered on the first fixed portion, and
    a third partial region being annular, the third partial region being provided between the first partial region and the second partial region and centered on the first fixed portion, the third partial region including a first movable portion electrode;
  a connecting portion provided between the first fixed portion and the second partial region, the connecting portion connecting the second partial region to the first fixed portion, a first gap being provided between the base body and the movable portion, and between the base body and the connecting portion; and
  a first fixed electrode fixed to the based body, the first electrode facing the first movable portion electrode, a second length of the second partial region along a radial direction being not less than 2 times a first length of the first partial region along the radial direction, the radial direction passing the first fixed portion and being along the first plane.

(Configuration 4)

The sensor according to Configuration 3, wherein the second length is 2.5 times or more the first length.

(Configuration 5)

A sensor, comprising:
a base body;
a first fixed portion fixed to the base body;
a movable portion provided around the first fixed portion in a first plane crossing a first direction from the base body to the first fixed portion, the movable portion including:
   a first partial region being annular, the first partial region being centered on the first fixed portion,
   a second partial region being annular, the second partial region being provided between the first partial region and the first fixed portion and centered on the first fixed portion, and
   a third partial region being annular, the third partial region being provided between the first partial region and the second partial region and centered on the first fixed portion, the third partial region including a first movable portion electrode;
a connecting portion provided between the first fixed portion and the second partial region, the connecting portion connecting the second partial region to the first fixed portion, a first gap being provided between the base body and the movable portion, and between the base body and the connecting portion; and
a first fixed electrode fixed to the based body, the first electrode facing the first movable portion electrode,
a second mass of the second partial region being not less than a first mass of the first partial region.

(Configuration 6)

The sensor according to Configuration 5, wherein the second mass is 1.2 times or more the first mass.

(Configuration 7)

A sensor, comprising:
a base body;
a first fixed portion fixed to the base body;
a movable portion provided around the first fixed portion in a first plane crossing a first direction from the base body to the first fixed portion, the movable portion including:
   a first partial region being annular, the first partial region being centered on the first fixed portion,
   a second partial region being annular, the second partial region being provided between the first partial region and the first fixed portion and centered on the first fixed portion, and
   a third partial region being annular, the third partial region being provided between the first partial region and the second partial region and centered on the first fixed portion, the third partial region including a first moving portion electrode;
a connecting portion provided between the first fixed portion and the second partial region, the connecting portion connecting the second partial region to the first fixed portion, a first gap being provided between the base body and the movable portion, and between the base body and the connecting portion; and
a first fixed electrode fixed to the based body, the first electrode facing the first movable portion electrode, the first partial region including a plurality of first holes, the first holes having a first width and a first density, the first width being a width of one of the first holes along a first radial direction, the first radial direction passing the first fixed portion and being along the first plane, the first density being a density of the first holes in the first plane,
the second partial region including a plurality of second holes, the second holes having at least one of a second width or a second density, the second width being smaller than the first width, the second density being lower than the first density, the second width being a width of one of the second holes along a second radial direction, the second radial direction passing the first fixed portion and being along the first plane, the second density being a density of the second holes in the first plane.

(Configuration 8)

The sensor according to Configuration 7, wherein
the first holes have an arc shape centered on the first fixed portion, and
the second holes have an arc shape centered on the first fixed portion.

(Configuration 9)

The sensor according to any one of Configurations 1-8, wherein
the third partial region includes a first fixed electrode hole provided with the first movable portion electrode, and
the first fixed electrode passes through the first fixed electrode hole.

(Configuration 10)

The sensor according to any one of Configurations 1-9, wherein the first fixed electrode faces the first movable portion electrode in the first plane.

(Configuration 11)

The sensor according to any one of Configurations 1-10, wherein
the first movable portion electrode is one of a first comb tooth electrode pair, and
the first fixed electrode is other of the first comb tooth electrode pair.

(Configuration 12)

The sensor according to any one of Configurations 1-11, further comprising a second fixed electrode fixed to the base body,
the third partial region including a second moving portion electrode,
the second fixed electrode facing the second movable portion electrode, and
the second fixed electrode being located between the second partial region and the first fixed electrode.

(Configuration 13)

The sensor according to Configuration 12, wherein
the third partial region includes a second fixed electrode hole provided with the second movable portion electrode, and
the second fixed electrode passes through the second fixed electrode hole.

(Configuration 14)

The sensor according to Configuration 12 or 13, wherein the second fixed electrode faces the second movable portion electrode in the first plane.

(Configuration 15)

The sensor according to any one of Configurations 1-14, further comprising a second fixed portion fixed to the base body, the third partial region including a second fixed portion hole, and the second fixed portion passing the second fixed portion hole.

(Configuration 16)

The sensor according to any one of Configurations 1-15, wherein a plurality of the first movable portion electrodes and a plurality of the first fixed electrodes are provided, the first movable portion electrodes are arranged in a circle centered on the first fixed portion, and the first fixed electrodes are arranged in a circle around the first fixed portion.

(Configuration 17)

The sensor according to Configuration 16, further comprising a plurality of third fixed electrodes fixed to the base body, the third partial region including a plurality of third movable portion electrodes, and one of the third fixed electrodes facing one of the third movable portion electrodes.

(Configuration 18)

The sensor according to Configuration 17, wherein the third fixed electrodes and the first fixed electrodes are arranged alternately along a circle centered on the first fixed portion.

(Configuration 19)

The sensor according to any one of Configurations 1-18, further comprising a controller, the controller being configured to apply a voltage between the movable portion and the first fixed electrode.

(Configuration 20)

The sensor according to Configuration 19, wherein the controller is configured to vibrate the movable portion by applying an AC voltage between the movable portion and the first fixed electrode.

According to the embodiment, it is possible to provide a sensor whose characteristics can be improved.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in sensors such as base bodies, fixed portions, moving portions, connecting portions, controllers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all sensors practicable by an appropriate design modification by one skilled in the art based on the sensors described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A sensor, comprising:

a base body;

a first fixed portion fixed to the base body;

a movable portion provided around the first fixed portion in a first plane crossing a first direction from the base body to the first fixed portion, the movable portion including:

a first partial region being annular, the first partial region being centered on the first fixed portion, a second partial region being annular, the second partial region being provided between the first partial region and the first fixed portion and centered on the first fixed portion, and a third partial region being annular, the third partial region being provided between the first partial region and the second partial region and centered on the first fixed portion, the third partial region including a first movable portion electrode;

a connecting portion provided between the first fixed portion and the second partial region, the connecting portion connecting the second partial region to the first fixed portion, a first gap being provided between the base body and the movable portion, and between the base body and the connecting portion; and a first fixed electrode fixed to the based body, the first electrode facing the first movable portion electrode, a second area of the second partial region on the first plane being not less than a first area of the first partial region on the first plane, wherein the first partial region extends, along a radial direction, from the third partial region to an edge of the movable portion, and the second partial region extends, along the radial direction, from the connecting portion to the third partial region.

2. The sensor according to claim 1, wherein the second area is 1.2 times or more the first area.

3. The sensor according to claim 1, wherein the third partial region includes a first fixed electrode hole provided with the first movable portion electrode, and the first fixed electrode passes through the first fixed electrode hole.

4. The sensor according to claim 1, wherein the first fixed electrode faces the first movable portion electrode in the first plane.

5. The sensor according to claim 1, wherein the first movable portion electrode is one of a first comb tooth electrode pair, and the first fixed electrode is other of the first comb tooth electrode pair.

6. The sensor according to claim 1, further comprising a second fixed electrode fixed to the base body, the third partial region including a second moving portion electrode, the second fixed electrode facing the second movable portion electrode, and the second fixed electrode being located between the second partial region and the first fixed electrode.

7. The sensor according to claim 6, wherein
the third partial region includes a second fixed electrode hole provided with the second movable portion electrode, and
the second fixed electrode passes through the second fixed electrode hole.

8. The sensor according to claim 6, wherein the second fixed electrode faces the second movable portion electrode in the first plane.

9. The sensor according to claim 1, further comprising a second fixed portion fixed to the base body,
the third partial region including a second fixed portion hole, and
the second fixed portion passing the second fixed portion hole.

10. The sensor according to claim 1, wherein
a plurality of the first movable portion electrodes and a plurality of the first fixed electrodes are provided,
the first movable portion electrodes are arranged in a circle centered on the first fixed portion, and
the first fixed electrodes are arranged in a circle around the first fixed portion.

11. The sensor according to claim 10, further comprising a plurality of third fixed electrodes fixed to the base body,
the third partial region including a plurality of third movable portion electrodes, and
one of the third fixed electrodes facing one of the third movable portion electrodes.

12. The sensor according to claim 11, wherein the third fixed electrodes and the first fixed electrodes are arranged alternately along a circle centered on the first fixed portion.

13. The sensor according to claim 1, further comprising a controller,
the controller being configured to apply a voltage between the movable portion and the first fixed electrode.

14. The sensor according to claim 13, wherein the controller is configured to vibrate the movable portion by applying an AC voltage between the movable portion and the first fixed electrode.

15. A sensor, comprising:
a base body;
a first fixed portion fixed to the base body;
a movable portion provided around the first fixed portion in a first plane crossing a first direction from the base body to the first fixed portion, the movable portion including:
a first partial region being annular, the first partial region being centered on the first fixed portion,
a second partial region being annular, the second partial region being provided between the first partial region and the first fixed portion and centered on the first fixed portion, and
a third partial region being annular, the third partial region being provided between the first partial region and the second partial region and centered on the first fixed portion, the third partial region including a first movable portion electrode;
a connecting portion provided between the first fixed portion and the second partial region, the connecting portion connecting the second partial region to the first fixed portion, a first gap being provided between the base body and the movable portion, and between the base body and the connecting portion; and
a first fixed electrode fixed to the based body, the first electrode facing the first movable portion electrode,
a second length of the second partial region along a radial direction being not less than 2 times a first length of the first partial region along the radial direction, the radial direction passing the first fixed portion and being along the first plane,
wherein
the first partial region extends, along a radial direction, from the third partial region to an edge of the movable portion, and
the second partial region extends, along the radial direction, from the connecting portion to the third partial region.

16. The sensor according to claim 15, wherein the second length is 2.5 times or more the first length.

17. A sensor, comprising:
a base body;
a first fixed portion fixed to the base body;
a movable portion provided around the first fixed portion in a first plane crossing a first direction from the base body to the first fixed portion, the movable portion including:
a first partial region being annular, the first partial region being centered on the first fixed portion,
a second partial region being annular, the second partial region being provided between the first partial region and the first fixed portion and centered on the first fixed portion, and
a third partial region being annular, the third partial region being provided between the first partial region and the second partial region and centered on the first fixed portion, the third partial region including a first movable portion electrode;
a connecting portion provided between the first fixed portion and the second partial region, the connecting portion connecting the second partial region to the first fixed portion, a first gap being provided between the base body and the movable portion, and between the base body and the connecting portion; and
a first fixed electrode fixed to the based body, the first electrode facing the first movable portion electrode,
a second mass of the second partial region being not less than a first mass of the first partial region,
wherein
the first partial region extends, along a radial direction, from the third partial region to an edge of the movable portion, and
the second partial region extends, along the radial direction, from the connecting portion to the third partial region.

18. The sensor according to claim 17, wherein the second mass is 1.2 times or more the first mass.

19. A sensor, comprising:
a base body;
a first fixed portion fixed to the base body;
a movable portion provided around the first fixed portion in a first plane crossing a first direction from the base body to the first fixed portion, the movable portion including:
a first partial region being annular, the first partial region being centered on the first fixed portion,
a second partial region being annular, the second partial region being provided between the first partial region and the first fixed portion and centered on the first fixed portion, and a third partial region being annular, the third partial region being provided between the first partial region and the second partial region and centered on the first fixed portion, the third partial region including a first moving portion electrode;

a connecting portion provided between the first fixed portion and the second partial region, the connecting portion connecting the second partial region to the first fixed portion, a first gap being provided between the base body and the movable portion, and between the base body and the connecting portion; and a first fixed electrode fixed to the based body, the first electrode facing the first movable portion electrode, the first partial region including a plurality of first holes, the first holes having a first width and a first density, the first width being a width of one of the first holes along a first radial direction, the first radial direction passing the first fixed portion and being along the first plane, the first density being a density of the first holes in the first plane, the second partial region including a plurality of second holes, the second holes having at least one of a second width or a second density, the second width being smaller than the first width, the second density being lower than the first density, the second width being a width of one of the second holes along a second radial direction, the second radial direction passing the first fixed portion and being along the first plane, the second density being a density of the second holes in the first plane.

* * * * *